(12) United States Patent
Han

(10) Patent No.: US 11,524,661 B2
(45) Date of Patent: Dec. 13, 2022

(54) CLEANING CONTROL DEVICE AND CLEANING CONTROL METHOD

(71) Applicant: HL KLEMOVE CORP., Incheon (KR)

(72) Inventor: Hakgu Han, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 183 days.

(21) Appl. No.: 16/900,859

(22) Filed: Jun. 12, 2020

(65) Prior Publication Data
US 2020/0391703 A1    Dec. 17, 2020

(30) Foreign Application Priority Data

Jun. 14, 2019 (KR) .................. 10-2019-0070501

(51) Int. Cl.
*B60S 1/66* (2006.01)
*B08B 3/02* (2006.01)

(52) U.S. Cl.
CPC ............. *B60S 1/66* (2013.01); *B08B 3/022* (2013.01)

(58) Field of Classification Search
None
See application file for complete search history.

(56) References Cited

U.S. PATENT DOCUMENTS

| 2015/0078940 A1* | 3/2015 | Kikuta | F04B 17/03 |
| | | | 417/443 |
| 2016/0001330 A1* | 1/2016 | Romack | B05B 1/08 |
| | | | 348/148 |
| 2019/0009752 A1* | 1/2019 | Rice | B60S 1/56 |
| 2019/0329720 A1* | 10/2019 | Brouwer | B60S 1/46 |

FOREIGN PATENT DOCUMENTS

| JP | 2015-47900 | 3/2015 |
| JP | 2015-57338 | 3/2015 |
| JP | 2017-197171 | 11/2017 |

* cited by examiner

*Primary Examiner* — Cristi J Tate-Sims
(74) *Attorney, Agent, or Firm* — Ladas & Parry, LLP

(57) ABSTRACT

The disclosure relates to a cleaning control device and cleaning control method. Specifically, according to the disclosure, a cleaning control device may comprise a shield divided into a plurality of regions, a moving actuator moving the shield, a sensor detecting an object by transmitting and receiving a detection signal through some regions of the plurality of regions of the shield, and a controller generating and outputting a cleaning control signal to spray a cleaning liquid to a signal transmission region placed side-by-side with the sensor among the plurality of regions if a foreign body is present in the signal transmission region and generating and outputting a moving control signal to move a signal non-transmission region placed non-side-by-side with the sensor among the plurality of regions to a position of the signal transmission region.

20 Claims, 18 Drawing Sheets

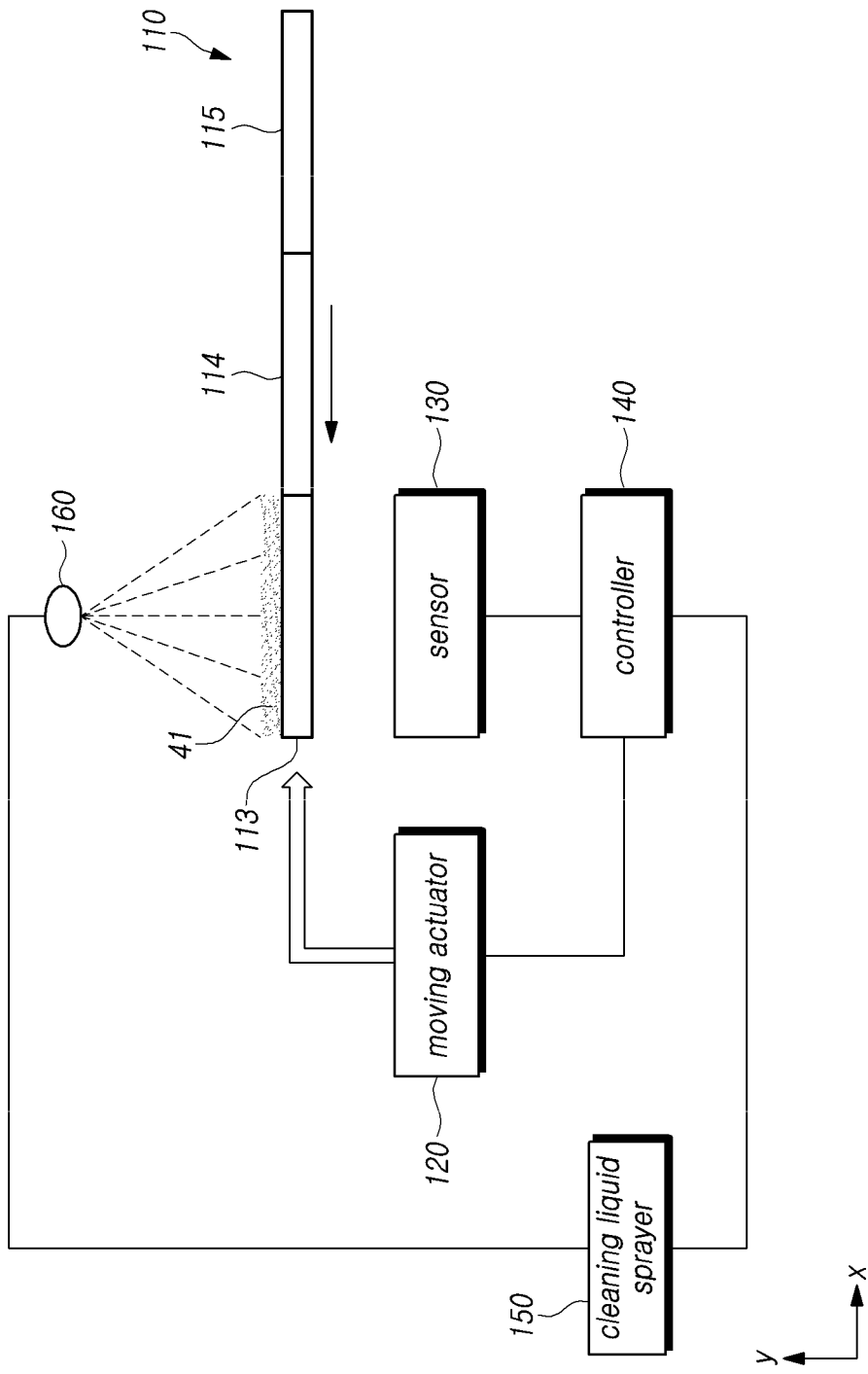

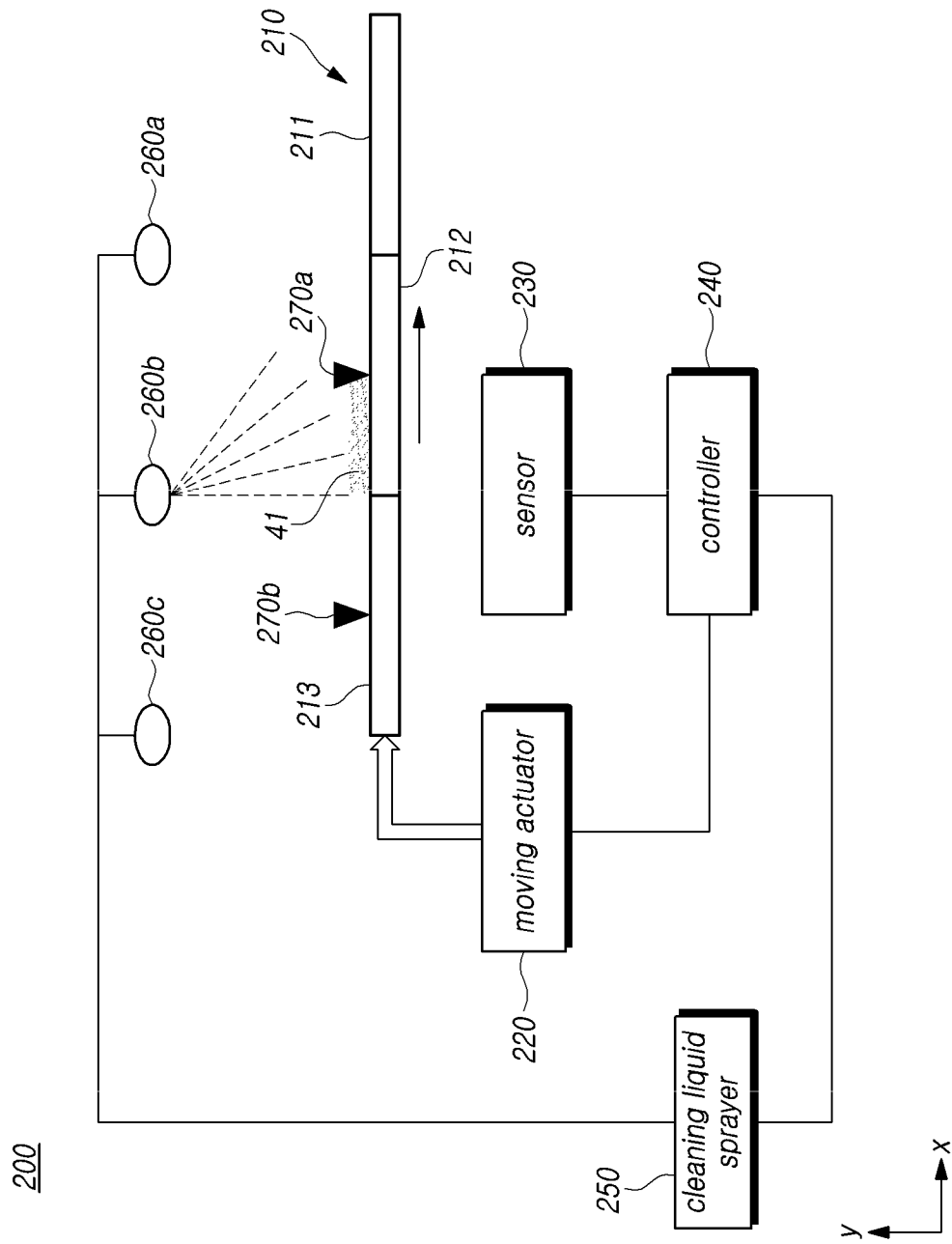

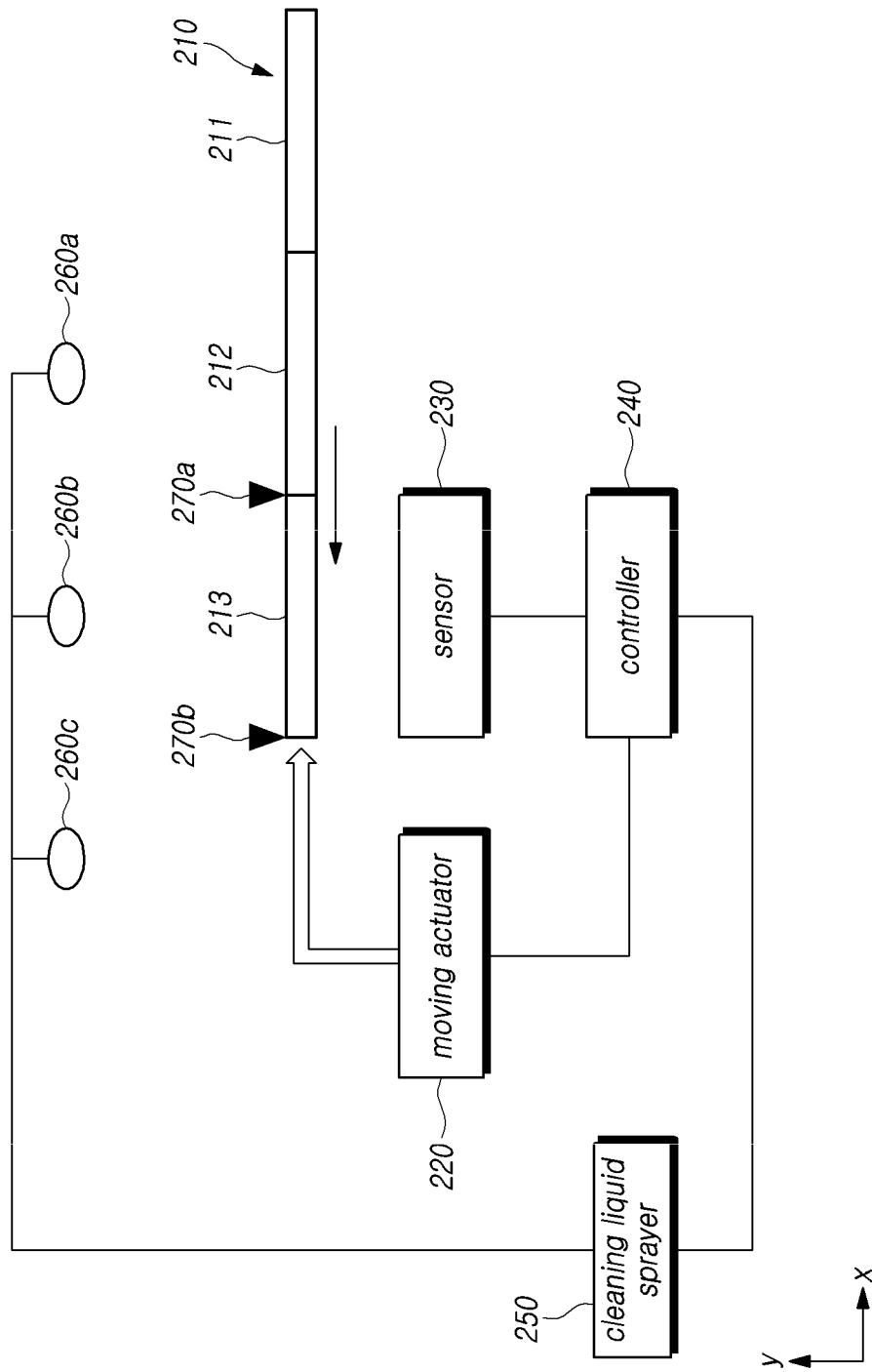

CLEANING CONTROL DEVICE AND CLEANING CONTROL METHOD

CROSS REFERENCE TO RELATED APPLICATION

This application claims priority from Korean Patent Application No. 10-2019-0070501, filed on Jun. 14, 2019, which is hereby incorporated by reference for all purposes as if fully set forth herein.

BACKGROUND

Field

The disclosure relates to a cleaning control device and cleaning control method. More specifically, the disclosures relates to technology of placing a shield for protecting a sensor and removing foreign bodies that may rest on the shield by discharging a jet of cleaning liquid.

Description of Related Art

An increased interest in autonomous vehicles (AVs) is leading to exponential advances in relevant technology.

AV technology encompasses detecting an object around a vehicle, issuing a command for controlling the driving speed, steering, braking, or acceleration of the vehicle depending on the state of the detected vehicle, and controlling the behavior of the vehicle according to the command.

The object around the vehicle is detected by a sensor. The sensor is mounted outside the vehicle, or the sensor is mounted inside the vehicle but adjacent to the outside of the vehicle.

Due to such placement of the sensor, foreign bodies may come from the outside directly to the sensor or may enter the vehicle and stick to the output part of the sensor, blocking the sensor and resultantly deteriorating the sensor's performance.

If small debris hits the sensor and causes scratches on the output part of the sensor, the signal output from the sensor may be distorted by the scratches.

Thus, a need exists for technology for protecting the sensor from small debris, dust, bugs, or other foreign bodies and cleaning the foreign bodies off.

BRIEF SUMMARY

With this background, the disclosure provides a cleaning control device and cleaning control method that may prevent foreign bodies from sticking to the sensor or prevent debris from hitting the sensor by placing a shield ahead of the sensor.

The disclosure also provides a cleaning control device and cleaning control method that may prevent a malfunction in the sensor by cleaning foreign bodies off the shield.

The disclosure also provides a cleaning control device and cleaning control method that may prevent a malfunction in the sensor and ensure driving safety by moving the shield to detect an object via a foreign body-free part of the shield.

The disclosure also provides a cleaning control device and cleaning control method that may efficiently remove foreign bodies by adjusting the spraying direction of a cleaning liquid depending on the moving direction of the shield.

According to an embodiment of the disclosure, there is provided a cleaning control device comprising a shield divided into a plurality of regions, a moving actuator moving the shield, a sensor detecting an object by transmitting and receiving a detection signal through some regions of the plurality of regions of the shield, and a controller generating and outputting a cleaning control signal to spray a cleaning liquid to a signal transmission region placed side-by-side with the sensor among the plurality of regions if a foreign body is present in the signal transmission region and generating and outputting a moving control signal to move a signal non-transmission region placed non-side-by-side with the sensor among the plurality of regions to a position of the signal transmission region.

According to an embodiment of the disclosure, there is provided a cleaning control method comprising determining whether a foreign body is present in a signal transmission region through which a detection signal from a sensor is transmitted among a plurality of regions of the shield, generating and outputting a cleaning control signal to spray a cleaning liquid to the signal transmission region if the foreign body is present in the signal transmission region, and generating and outputting a moving control signal to move a signal non-transmission region of the plurality of regions to a position of the signal transmission region if the foreign body is present in the signal transmission region.

As described above, according to the disclosure, there may be provided a cleaning control device and cleaning control method that may prevent foreign bodies from sticking to the sensor or prevent debris from hitting the sensor by placing a shield ahead of the sensor.

According to the disclosure, there may be provided a cleaning control device and cleaning control method that may prevent a malfunction in the sensor by cleaning foreign bodies off the shield.

According to the disclosure, there may be provided a cleaning control device and cleaning control method that may prevent a malfunction in the sensor and ensure driving safety by moving the shield to detect an object via a foreign body-free part of the shield.

According to the disclosure, there may be provided a cleaning control device and cleaning control method that may efficiently remove foreign bodies by adjusting the spraying direction of a cleaning liquid depending on the moving direction of the shield.

DESCRIPTION OF DRAWINGS

FIGS. 5A, 5B, and 5C are views illustrating an example of a cleaning control device as illustrated in FIG. 3, according to an embodiment of the disclosure;

FIGS. 7A, 7B, 7C, and 7D are views illustrating an example of a cleaning control device as illustrated in FIG. 6, according to an embodiment of the disclosure;

DETAILED DESCRIPTION

Hereinafter, embodiments of the disclosure are described in detail with reference to the accompanying drawings. Such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element.

Figure 1:
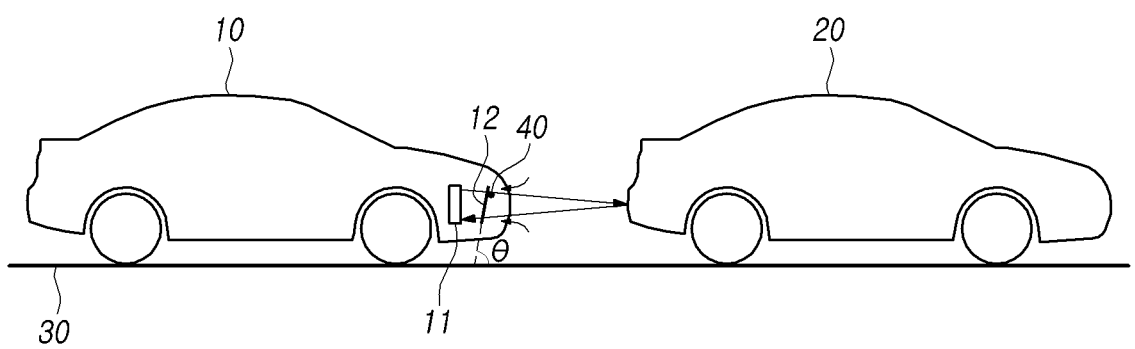
FIG. 1 is a view illustrating a shield and a sensor mounted to a vehicle according to the disclosure.

FIG. 1 is a view illustrating a shield 12 and a sensor 11 mounted to a vehicle 10 according to the disclosure.

Referring to FIG. 1, a sensor 11 included in a vehicle 10, according to the disclosure, may detect an object around a vehicle 10. Specifically, the sensor 11 may transmit a detection signal and receive the detection signal reflected by the object around the vehicle 10, thereby measuring, e.g., the position of the object, the distance between the vehicle 10 and the object, and the relative speed.

For example, the sensor 11 may transmit a detection signal to another vehicle 20 ahead of the vehicle 10, receive the detection signal reflected by the other vehicle 20, and process the received detection signal, thereby detecting the distance between the vehicle 10 and the other vehicle 20 and the relative speed.

The sensor 11 includes an output part that outputs the detection signal, and the output part may include a window.

The sensor 11 may determine whether a foreign body 40 is present on the output part or the window.

For example, if the received amount of the detection signal is smaller than a preset reference received amount during a preset reception period, the sensor 11 determines that the foreign body 40 is present.

As another example, if the sensor 11 is able to internally communicate with a detector (not shown) for detecting the detection signal scattered or reflected, the detector compares the scattered amount or reflected amount of the detection signal with a preset reference scattered amount or reference reflected amount. If the scattered amount and reflected amount of the detection signal detected by the detector is not less than the reference scattered amount or reference reflected amount, the detector generates a flag signal and outputs the flag signal to the sensor 11 and, upon receiving the flag signal, the sensor 11 determines that there is the foreign body 40.

The reception period, reference received amount, reference scattered amount, and reference reflected amount may be designed by a designer or determined as experimental values.

As another example, if a reference distance which is measured all the time in a normal state is not measured or intermittently measured during a preset measurement period, the sensor 11 determines that there is the foreign body 40.

The reference distance may be a distance that is always measured by the sensor 11 in the normal state where no foreign body 40 is present on the sensor 11 or the shield 12. The reference distance may be a ground distance between the sensor 11 and the ground 30, and the reference distance always measured may be designed by the designer or determined as an experimental value.

As long as it is cable of detecting an object, the sensor 11 is not limited to a specific kind.

For example, the sensor 11 may be an optical sensor, e.g., a camera or light detection and range (LiDAR), that transmits/receives optical signals to detect an object. Specifically, the sensor 11 which corresponds to an optical sensor may receive an optical signal reflected by an object, converts the optical signal into an electrical signal using an analog-digital converter (ADC), and amplify and process the electrical signal using an avalanche photo diode (APD), thereby detecting the object.

As another example, the sensor 11 may be a sensor that may detect an object by transmitting/receiving an electromagnetic signal or sound wave signal, such as radio detection and ranging (RADAR) or ultrasonic.

The foreign body 40, e.g., a small stone or debris, may come from outside of the vehicle 10 to the inside of the vehicle 10. The foreign body 40 may damage the sensor 11, and the damaged sensor 11 may cause a malfunction and thus fail to precisely detect the object.

Thus, the shield 12 may be placed on the output part of the sensor 11 to protect the sensor 11.

The shield 12 may directly prevent damage to the sensor 11 due to, e.g., the foreign body 40 such as a stone or debris and prevent a malfunction in the sensor 11 due to the foreign body 40 such as bugs or dust.

Preferably, the shield 12 may be angled at an acute or obtuse angle from the ground 30. For example, the shield 12 may be slanted at an acute angle forward of the vehicle 10 as shown in FIG. 1. In other words, the shield 12 may be slanted from its position perpendicular to the ground towards the inside the vehicle so that the interior angle is directed forward of the vehicle and forms an acute angle from the ground. In contrast, the shield 12 may be placed so that its angle from the ground forms an obtuse angle.

If the shield 12 is placed at an acute or obtuse angle from the ground 30, the foreign body 40 entering the vehicle 10 may be further prevented from sticking to the shield 12.

The detection signal from the sensor 11, when received by the sensor 11 through the shield 12, mostly passes through the shield 12 while a portion thereof may be reflected or scattered on the surface the shield 12. For example, if the sensor 11 is a LiDAR, the optical signal from the LiDAR is mostly transmitted through the shield 12, with a portion thereof reflected or scattered by the shield 12.

If the shield 12 is placed to remain at a predetermined angle from the ground 30, the angle of incidence of the detection signal incident onto the shield 12 may be changed. Thus, the shield 12 placed to remain at the predetermined angle may minimize the scattering or reflection of the detection signal.

Although the shield 12 is placed at an acute or obtuse angle from the ground 30 for illustration purposes, embodiments of the disclosure are not limited thereto. For example, the shield 12 may be positioned in any placement that may minimize the scattered or reflected amount of the optical signal by changing the angle of incidence of the optical signal to the surface of the shield 12 at side view as shown in FIG. 1.

Although FIG. 1 illustrates that the sensor 11 and the shield 12 are placed at the front of the vehicle, the sensors 11 and the shield 12, without limitations thereto, may be positioned at the rear or side of the vehicle or at the top of the vehicle to detect the whole area.

Despite the placement of the shield 12 ahead of the sensor 11, ingress of outside foreign bodies 40, e.g., bugs or dust, which may stick to the surface of the shield 12 may cause the sensor 11 to be blocked by the foreign bodies 40, deteriorating the performance of the sensor 11. This leads to the need for determining whether the foreign body 40 is present on the shield 12 and taking a measure accordingly.

An embodiment of determining whether a foreign body is present on the shield 12 is described below.

Figure 2:
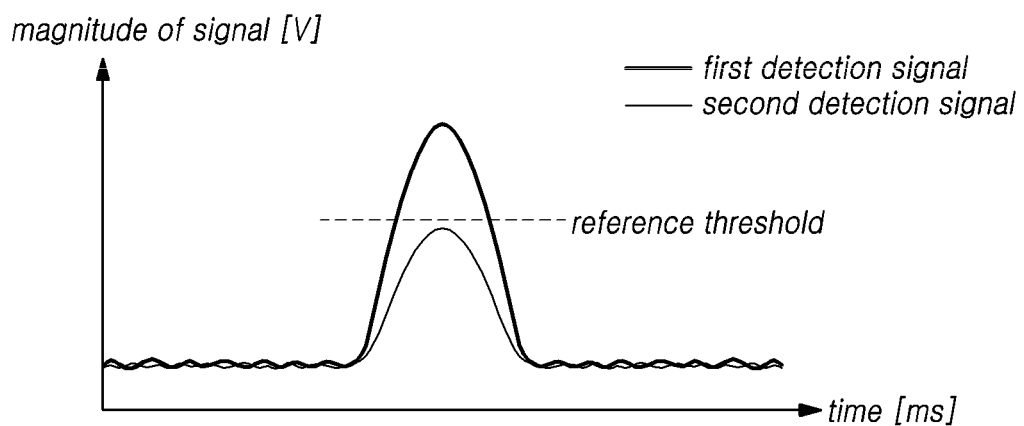
FIG. 2 is a graph illustrating an example of determining whether a foreign body is present on a shield according to an embodiment of the disclosure.

FIG. 2 is a graph illustrating an example of determining whether a foreign body 40 is present on a shield 12 according to an embodiment of the disclosure.

Referring to FIG. 2, the sensor 11 may amplify the received detection signal, compare the maximum value of the amplified detection signal with a preset reference threshold, and process the detection signal.

For example, as described above, if the sensor 11 is an optical sensor, the sensor 11 converts an optical signal, which is a first detection signal received, into an electrical signal, amplifies the electrical signal, compares the maximum value of the amplified electrical signal with the reference threshold, and processes the electrical signal (first detection signal) which is not smaller than the reference threshold.

The reference threshold may be previously determined, e.g., experimentally or via a design algorithm.

If the maximum magnitude of the received detection signal is smaller than the preset reference threshold, the sensor 11 may determine that a foreign body 40 is present on the shield 12.

For example, as described above, if the sensor 11 is an optical sensor, the sensor 11 converts an optical signal, which is a second detection signal received, into an electrical signal, amplifies the electrical signal and, if the maximum value of the amplified electrical signal is smaller than the reference threshold, determines that no foreign body 40 is present on the shield 12 and refrains from processing the amplified electrical signal (second detection signal).

As described above in connection with FIG. 1, the sensor 11 may determine whether the foreign body 40 is present on the shield 12 based on the received amount of the detection signal or the reference distance always measured in the normal state.

If the foreign body 40 is determined to be present on the shield 12, it may be needed to remove the foreign body by cleaning the surface of the shield 12.

A cleaning control device for attaining the foregoing objective is described below.

Figure 3:
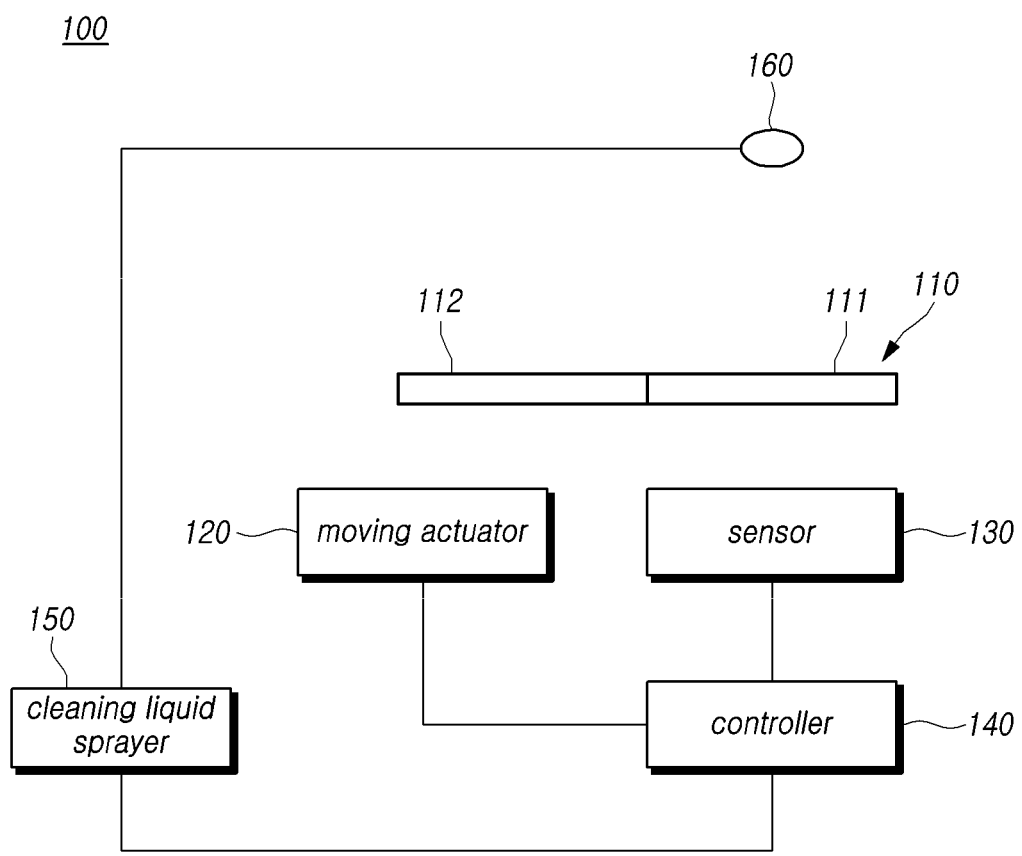
FIG. 3 is a view schematically illustrating a cleaning control device according to an embodiment of the disclosure.

FIG. 3 is a view schematically illustrating a cleaning control device 100 according to an embodiment of the disclosure.

Referring to FIG. 3, according to an embodiment of the disclosure, a cleaning control device 100 may include a shield 110, a moving actuator 120, a sensor 130, a controller 140, a cleaning liquid sprayer 150, and a nozzle 160.

The shield 110 may be installed on one surface of the sensor 130, e.g., the surface of the sensor 130, where the detection signal from the sensor 130 is transmitted and received.

The shield 110 may be divided into a plurality of regions 111 and 112 which may be referred to as a signal transmission region and a signal non-transmission region depending on the position of the sensor 130 as described below.

There may be provided one or more shields 110. If only one shield 110 is provided, the shield 110 may include a plurality of regions. In this case, the size (width) of the region may be identical to the output range of the detection signal. However, embodiments of the disclosure are not limited thereto.

If two or more shields 110 are provided, the plurality of shields themselves may serve as the plurality of regions. For illustration purposes, an example in which a single shield 110 is provided is described herein.

The shield 110 may be placed to be perpendicular to the ground or be angled at an acute or obtuse angle from the ground.

The shield 110 may be formed of a transparent, high-thermal conductive material through which the detection signal from the sensor 130 may be transmitted. For example, the shield 110 may be formed of glass. However, embodiments of the disclosure are not limited thereto. A coating may be formed on the surface of the shield 110 to prevent a foreign body or liquid from easily sticking to the surface of the shield 110.

Although not shown in FIG. 3, the shield 110 may further include a heating member on its surface which faces the output part of the sensor.

The heating member may mean a member that is electrically connected with the controller 140 and produces heat by an electrical signal from the controller 140.

The heating member may be provided in various placements. For example, the heating member may be disposed along the edge of the surface of the shield 110. However, embodiments of the disclosure are not limited thereto.

The heating member may be, e.g., a heating wire or heating sheet but, without limitations thereto, the heating member may be any heating element with superior electrical or thermal conductivity.

The shield 110 including the heating member may prevent frost due to a temperature difference between the inside and outside of the vehicle or prevent freezing of the cleaning liquid sprayed to the surface of the shield 110 at a low outside temperature.

The moving actuator 120 may move the shield 110. Specifically, the moving actuator 120 may receive a moving control signal from the controller 140 and move straight the shield 110 so that any one of the plurality of regions 111 and 112 of the shield 110 is disposed side-by-side with the sensor 130, based on the moving control signal.

The moving actuator 120 may change the moving time and distance of the shield 110 according to a specific moving control signal.

To perform such operation, the moving actuator 120 may include a device and components for moving straight the shield 110. Although not shown, the moving actuator 120 may include a motor, a gear coupled with the motor, and a belt engaged with the gear and rotatably installed on one side of the shield 110. In other words, as the motor spins and thus the gear and belt rotate, the shield 110 may be carried by the belt and move along a straight line. However, embodiments of the disclosure are not limited thereto.

The sensor 130 may transmit/receive the detection signal via a signal transmission region, which is one of the plurality of regions of the shield 110, detecting the object. The sensor 130 may include, e.g., an optical sensor or electromagnetic sensor as described above in connection with FIG. 1.

The sensor 130 may transmit a detection signal in one direction and receive the detection signal returning in one direction. For example, the sensor 130 may transmit/receive a detection signal in the direction where the nozzle 160 of FIG. 3 is positioned.

The signal transmission region may mean a region through which the detection signal may be transmitted. The signal transmission region may be a region disposed side-by-side with the sensor 130, among the plurality of regions of the shield 110. The signal non-transmission region may mean a region through which the detection signal is not transmitted currently due to a limit on the output range of the sensor 130 but may be transmitted as the shield 110 is moved as described below. The signal non-transmission region may be a region which is not disposed side-by-side with the sensor 130.

As a specific example, if a first region 111 of the shield 110 is disposed side-by-side with the sensor 130 as shown in FIG. 3, the first region 111 is the signal transmission region, and the second region 112 is the signal non-transmission region. In contrast, if the second region 112 of the shield 110 is disposed side-by-side with the sensor 130, the second region 112 is the signal transmission region, and the first region 112 is the signal non-transmission region.

The sensor 130 may determine whether a foreign body is present on the shield 110 as described above in connection with FIG. 2 and generate a contamination notification signal for indicating the same, and output the contamination notification signal to the controller 140.

The sensor 130 may include a cover for protecting the output part of the sensor 130, separately from the shield 110.

The controller 140 may generate and output a cleaning control signal to allow the cleaning liquid to the signal transmission region if the foreign body is present in the signal transmission region and may generate and output a moving control signal to allow the signal non-transmission region of the plurality of regions to move to the signal transmission region.

Specifically, if the sensor 130 determines that the foreign body is present in the signal transmission region and outputs a contamination notification signal to the controller 140, the controller 140 may generate a cleaning control signal and output the cleaning control signal to the cleaning liquid sprayer 150 and generate a moving control signal and output the moving control signal to the moving actuator 120.

The order of control by the controller 140, i.e., the order of controlling the cleaning liquid sprayer 150 and the moving actuator 120 by the controller 140 may be varied, as necessary.

The controller 140 may generate a heating control signal and apply the heating control signal to the heating member. If the heating control signal is applied to the heating member, the heating member generates heat, and the temperature of the shield 110 (or the surface temperature of the shield 110) rises. In contrast, unless the heating control signal is applied to the heating member, the heating member stops generating heat, and the temperature of the shield 110 lowers.

The controller 140 may generate a heating control signal and apply the heating control signal to the heating member, as necessary. For example, the controller 140 may apply the heating control signal to the heating member based on, e.g., the internal temperature or internal humidity of the cleaning control device 100 and the amount of cleaning liquid sprayed to the shield 110 or may apply the heating control signal to the heating member according to the operator's command. However, embodiments of the disclosure are not limited thereto.

As the controller 140 generates a heating control signal and applies the heating control signal to the heating member at a proper time, the sensor 130 may be prevented from a lowering in the sensing performance or a malfunction in the sensor 130.

The controller 140 may be implemented as, e.g., an electronic controller unit (ECU), a micro controller unit (MCU), or a domain control unit (DCU). However, embodiments of the disclosure are not limited thereto.

The cleaning liquid sprayer 150 may receive a cleaning control signal, spraying the cleaning liquid to the shield 110 through the nozzle 160. The cleaning liquid sprayer 150 may adjust, e.g., the spraying direction and strength of the cleaning liquid according to a specific cleaning control signal.

Although the cleaning liquid sprayer 150 may be a device separately provided, the cleaning liquid sprayer 150 may be a device that cleans the windshield (not shown) of the vehicle 10 using a washer fluid to enable a lightweight vehicle. In this case, the cleaning liquid sprayer 150 may be driven to connect a separate container, tube, or piping to the nozzle 160 to spray the washer fluid to the shield 110.

The cleaning liquid sprayer 150 may receive a direction control signal output from the controller 140 and adjust the direction of the nozzle 160 to change the spraying direction of the cleaning liquid.

There may be provided one or more nozzles 160 which are disposed to correspond to the respective positions of the plurality of regions 111 and 112, respectively, of the shield 110 and may be placed in proper positions not to block the sensor 130.

Although not shown, the cleaning control device 100 according to the disclosure may further include a temperature sensor capable of detecting the temperature of the inside of the device and a humidity sensor capable of measuring the humidity of the inside of the device.

According to an embodiment of the disclosure, the cleaning control device 100 may be mounted to the vehicle 10. However, without limitations thereto, the cleaning control device 100 may be mounted to any moving means, such as the vehicle 10.

According to what has been described above, the cleaning control device 100 according to an embodiment of the disclosure may prevent a foreign body from sticking to the sensor 130 directly using the shield 110 and may clean the foreign body from the shield 110 to thereby prevent a malfunction in the sensor 130.

Embodiments of the cleaning control device 100 are described below in detail according to the disclosure.

Figure 4A:
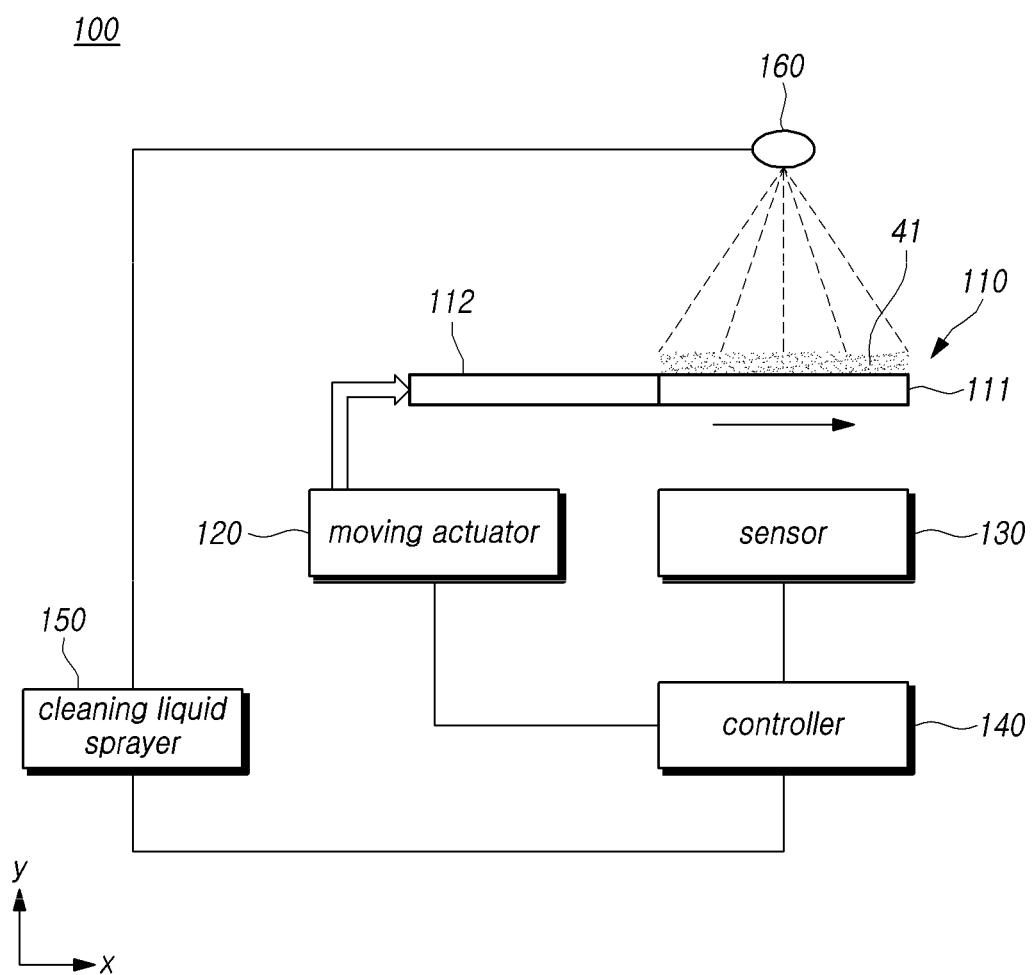
FIGS. 4A, 4B, and 4C are views illustrating an example of a cleaning control device as illustrated in FIG. 3, according to an embodiment of the disclosure.
Figure 4B:
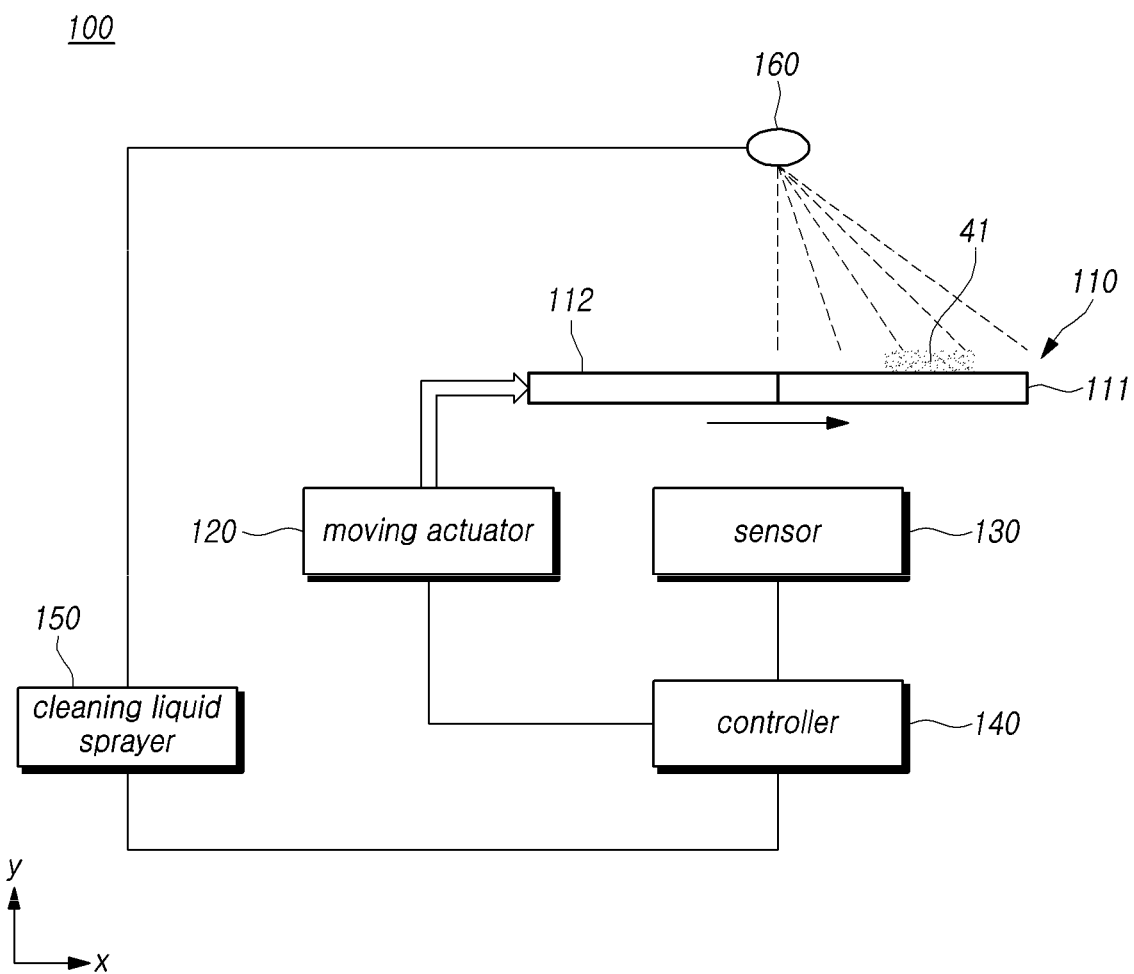
Figure 4C:
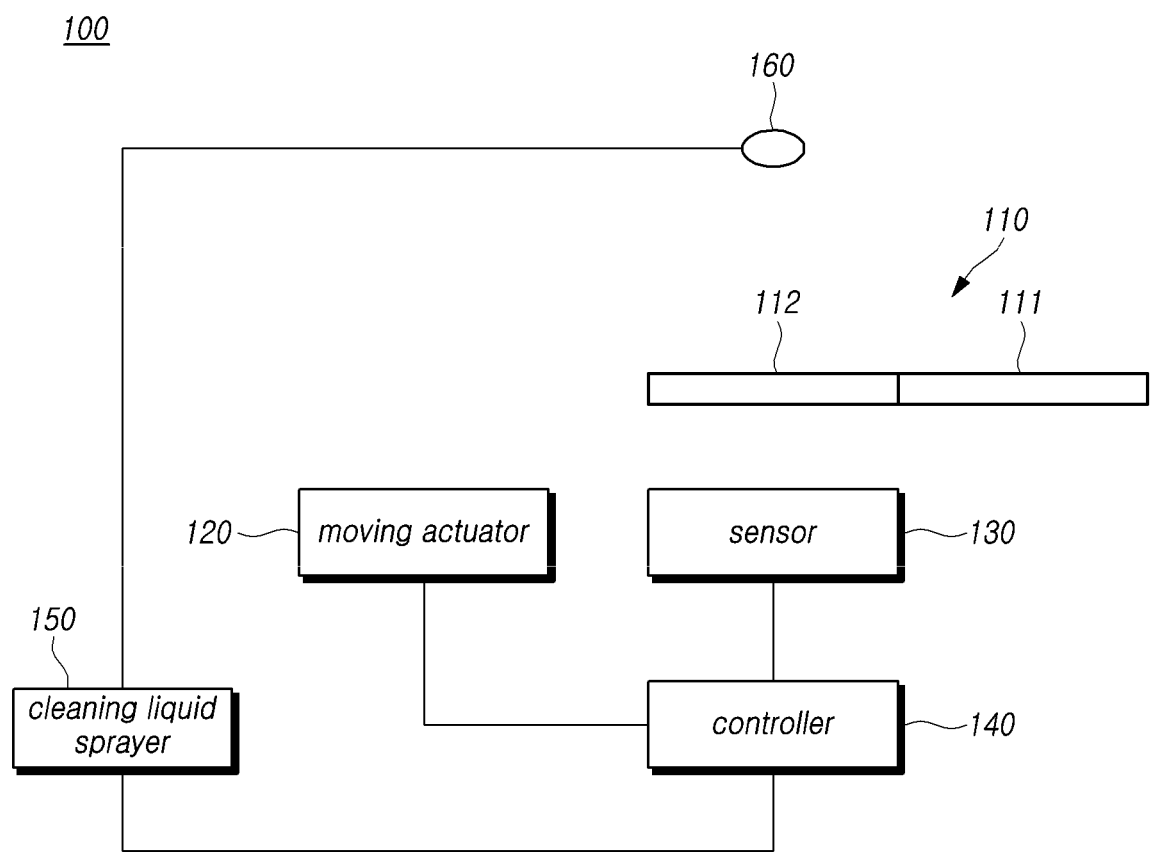

FIGS. 4A, 4B, and 4C are views illustrating an example of a cleaning control device 100 as illustrated in FIG. 3, according to an embodiment of the disclosure.

Referring to FIG. 4A, the sensor 130 may transmit/receive a detection signal via the signal transmission region, thereby detecting the object.

For example, if the first region 111 of the shield 110 is disposed side-by-side with the sensor 130, the sensor 130 detects the object by transmitting/receiving a detection signal through the first region 111 which is the signal transmission region.

In this case, if a foreign body 41, which originated from the outside, is present in the signal transmission region, the sensor 130 may identify the foreign body 41 present in the signal transmission region.

For example, as described above in connection with FIG. 2, if the maximum magnitude of the detection signal received is smaller than a preset reference threshold, the sensor 130 determines that the foreign body 41 is present in the first region 111, which is the signal transmission region, generates a contamination notification signal and outputs the contamination notification signal to the controller 140.

Upon receiving the contamination notification signal, the controller 140 may generate a cleaning control signal and output the cleaning control signal to the cleaning liquid sprayer 150, and may generate a moving control signal and output the moving control signal to the moving actuator 120.

The moving actuator 120 may receive the moving control signal and drive the shield 110 to move. For example, if the moving control signal indicates a movement in a +x direction, the moving actuator 120 may drive the shield 110 to move in the +x direction.

The cleaning liquid sprayer 150 may receive the cleaning control signal and spray the cleaning liquid to the signal transmission region through the nozzle 160. For example, the cleaning liquid sprayer 150 may discharge a high pressure jet of the cleaning liquid to the first region 111, which is the signal transmission region.

As the shield 110 moves, the spraying direction of the cleaning liquid needs to be changed to allow the cleaning liquid to be directed only to the foreign body 41.

Referring to FIG. 4B, the controller 140 may adjust the spraying direction of the high-pressure jet of cleaning liquid to the signal transmission region, depending on the moving direction of the shield 110. Specifically, while the shield 110 moves, the controller 140 may generate a direction control signal to indicate the spraying direction so that the spraying direction of the cleaning liquid sprayed to the signal transmission region is changed depending on the moving direction of the shield 110 and may output the direction control signal to the cleaning liquid sprayer 150.

For example, the controller 140 generates a cleaning control signal to indicate the spraying direction of the cleaning liquid so that the spraying direction of the cleaning liquid follows the +x direction of the shield 110 and outputs the cleaning control signal to the cleaning liquid sprayer 150. The cleaning liquid sprayer 150 changes the spraying direction of the cleaning liquid by adjusting the amount of opening and closing the valve of the nozzle 160 or the direction of the nozzle 160.

According to the foregoing description, the cleaning control device 100 according to an embodiment of the disclosure may more efficiently remove the foreign body 41 by adjusting the spraying direction of the cleaning liquid.

Referring to FIG. 4C, if the signal non-transmission region moves to the signal transmission region and the movement of the shield 110 is done, the controller 140 may generate a cleaning stop control signal to stop the spraying of the cleaning liquid and output the cleaning stop control signal to the cleaning liquid sprayer 150.

The sensor 130 may detect the object by transmitting/receiving a detection signal through the signal transmission region newly disposed side-by-side with the sensor 130.

For example, if the second region 112, which used to be the signal non-transmission region, moves to the initial position of the first region 111 and is thus positioned side-by-side with the sensor 130, the second region 112 becomes the signal transmission region, and the sensor 130 transmits/receives a detection signal through the second region 112, which is the signal transmission region, thereby detecting the object.

According to the foregoing description, the cleaning control device 100 according to an embodiment of the disclosure may prevent a malfunction in the sensor 130 by replacing with the portion where no foreign body is present in the shield 110.

When the sensor 130 detects the object via the new region of the shield 110, a foreign body 41 may again exist in the new region. In this case, if the cleaning liquid temporarily remains in the region of the shield 110, to which the embodiment of the disclosure has first been applied, e.g., the first region, it may be hard for the sensor 130 to precisely detect the object due to the remaining cleaning liquid.

Thus, it is needed to place the region, where the cleaning liquid does not remain, side-by-side with the sensor 130 to thereby prevent a malfunction in the sensor 130.

Figure 5B:
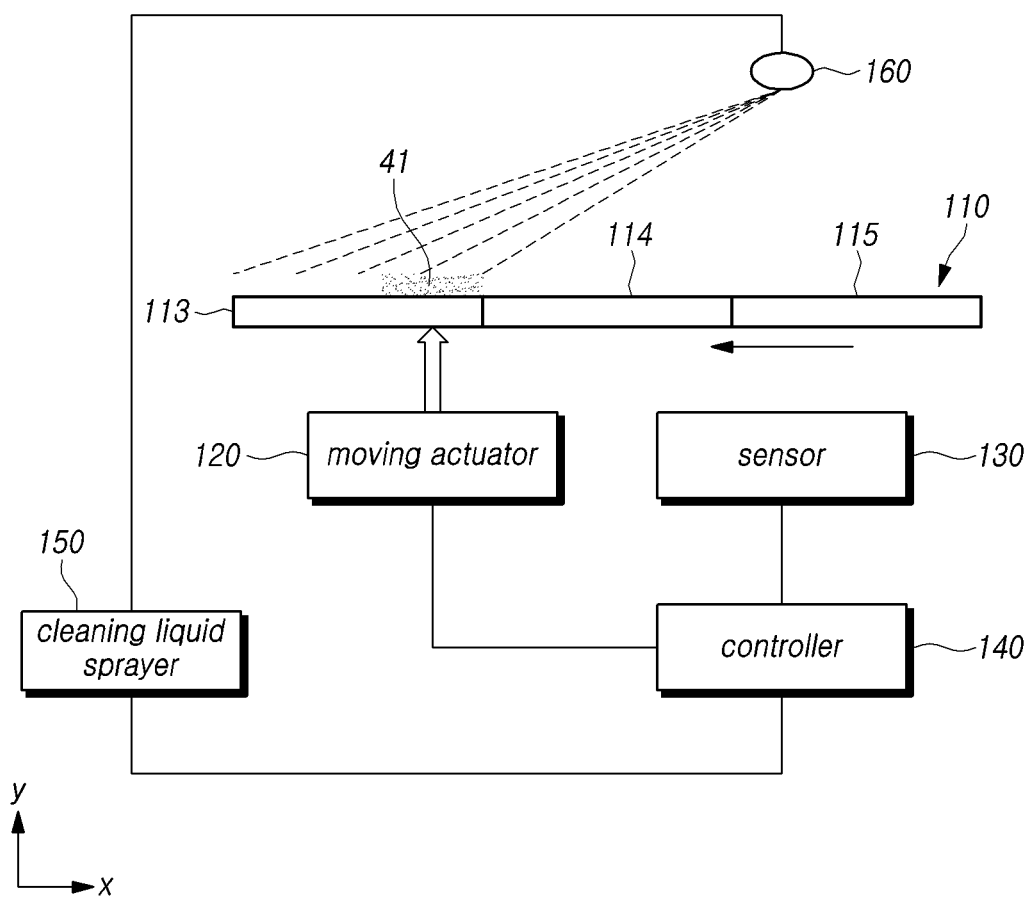
Figure 5C:
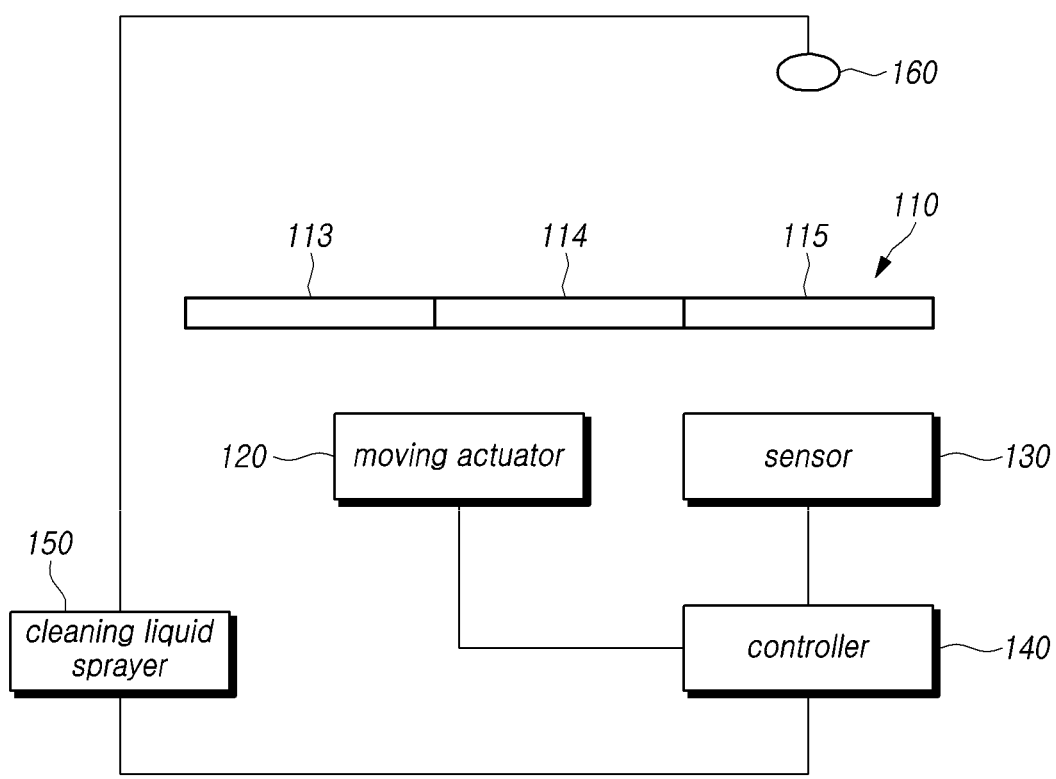

FIGS. 5A, 5B, and 5C are views illustrating an example of a cleaning control device 100 as illustrated in FIG. 3, according to an embodiment of the disclosure.

Referring to FIG. 5A, the shield 110 may be divided into three or more regions 113, 114, and 115. Described below is an example in which as the first region 113 used to be a first signal non-transmission region before is moved and the movement of the shield 110 is complete, the first region 113 becomes a signal transmission region, and the second region 114 which used to be the signal transmission region before becomes the signal non-transmission region.

If the foreign body 41 is present in the first region 113, which is currently the signal transmission region, of the shield 110, the controller 140 may generate a cleaning control signal and output the cleaning control signal to the cleaning liquid sprayer 150 as described above.

The cleaning liquid sprayer 150 may spray the cleaning liquid through the nozzle 160 to the first region 113.

The controller 140 may generate a moving control signal to move the shield 110 in a −x direction and output the moving control signal to the moving actuator 120.

The moving actuator 120 may drive the shield 110 to move in the −x direction.

Referring to FIG. 5B, the controller 140 may generate a cleaning control signal to indicate the spraying direction of the cleaning liquid so that the spraying direction of the cleaning liquid follows the moving direction (e.g., the −x direction) of the shield 110 and output the cleaning control signal to the cleaning liquid sprayer 150.

The controller 140 may generate and output a moving control signal to allow the second signal non-transmission region, among the plurality of regions, to move to the current signal transmission region.

For example, the controller 140 continues to generate a moving control signal to allow a third region 115, which used to be the second signal non-transmission region, instead of the second region 114, which used to be the signal transmission region before, to become the signal transmission region and outputs the moving control signal to the moving actuator 120.

Referring to FIG. 5C, if the second signal non-transmission region moves to the signal transmission region and the movement of the shield 110 is done, the controller 140 may generate a cleaning stop control signal to stop the spraying of the cleaning liquid and output the cleaning stop control signal to the cleaning liquid sprayer 150.

The sensor 130 may detect the object by newly transmitting/receiving a detection signal through the signal transmission region disposed side-by-side with the sensor 130.

For example, if the third region 115, which is the second signal non-transmission region, is positioned side-by-side with the sensor 130 and thus becomes the signal transmission region, the sensor 130 detects the object through the third region 115.

According to the foregoing description, the cleaning control device 100 according to an embodiment of the disclosure properly selects the plurality of regions 113, 114, and 115 included in the shield 110 to thereby prevent a malfunction in the sensor 130.

Even with discharging of the high-pressure jet of the cleaning liquid and proper changing of the regions of the shield 110, the cleaning liquid may remain on the surface of the shield 110 if the operation is repeated for a predetermined time, and the remaining cleaning liquid may cause a malfunction in the sensor 130. Thus, it is required to immediately remove the foreign body and cleaning liquid.

Figure 6:
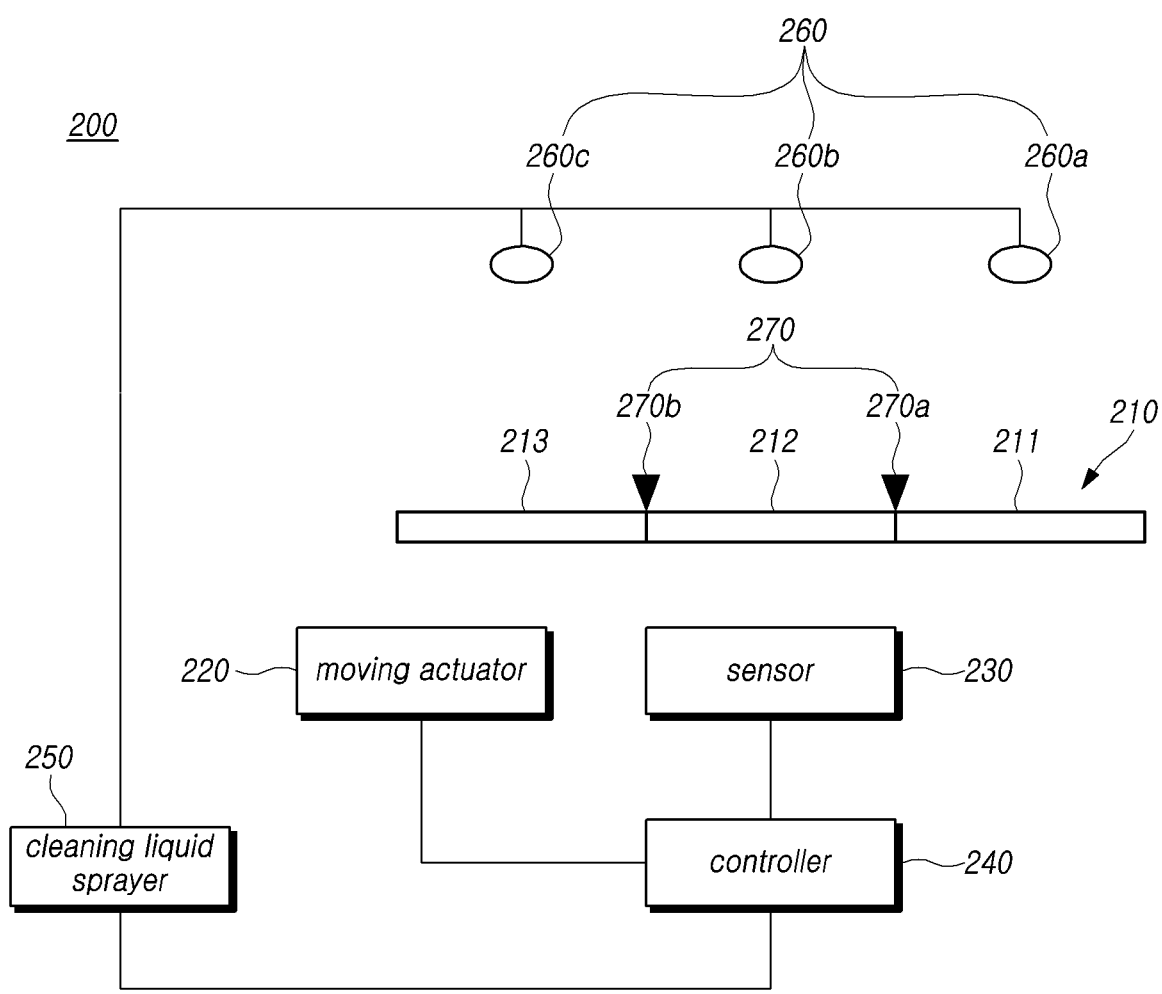
FIG. 6 is a view schematically illustrating a cleaning control device according to an embodiment of the disclosure.

FIG. 6 is a view schematically illustrating a cleaning control device 200 according to an embodiment of the disclosure.

Referring to FIG. 6, according to an embodiment of the disclosure, a cleaning control device 200 may include a shield 210, a moving actuator 220, a sensor 230, a controller 240, a cleaning liquid sprayer 250, a nozzle 260, and a cleaning member 270.

The shield 210, moving actuator 220, sensor 230, and controller 240 are the same as those of FIG. 3 and thus no detailed description thereof is given below.

The cleaning liquid sprayer 250 may receive a cleaning control signal from the controller 240 as shown in FIG. 3, adjust the opening/closing of each of the plurality of nozzles 260a, 260b, and 260c, and spray the cleaning liquid.

For example, the cleaning liquid sprayer 250 sprays the cleaning liquid through any one of a first nozzle 260a, a second nozzle 260b, and a third nozzle 260c.

The cleaning liquid sprayer 250 may receive a cleaning control signal from the controller 240 and adjust the plurality of nozzles 260a, 260b, and 260c to spray the cleaning liquid simultaneously or sequentially.

For example, the cleaning liquid sprayer 250 sprays the cleaning liquid simultaneously through the first nozzle 260a and the second nozzle 260b via the opening/closing of the first nozzle 260a and the second nozzle 260b.

The plurality of nozzles 260a, 260b, and 260c may be disposed corresponding to the respective positions of the plurality of regions 211, 212, and 213, respectively, of the shield 210. Although FIG. 6 illustrates an example in which the number of the nozzles is three, embodiments of the disclosure are not limited thereto.

The cleaning member 270 may contact the boundary between the signal transmission region and the signal non-transmission region before the shield 210 moves. There may be provided one or more cleaning members 270 including a plurality of cleaning members 270a and 270b which may be spaced apart from each other at a predetermined interval.

For example, if the second region 212 of the shield 210 is the signal transmission region, the first cleaning member 270a contacts the right boundary of the second region 212, which is the signal transmission region with respect to the position of the sensor, and the second cleaning member 270b contacts the left boundary of the second region 212.

The cleaning member 270 may be fixed regardless of the movement of the shield 210. In other words, the cleaning member 270 may be installed in the vehicle 10 or a housing (not shown). However, embodiments of the disclosure are not limited thereto.

If the shield 210 is placed while remaining at an acute or obtuse angle from the ground, the cleaning member 270 may also be placed and fixed while remaining at the same angle as the shield 210 so as to contact one surface of the shield 210.

The use of the cleaning member 270 provides a stronger tight contact between the shield 210 and the cleaning member 270 than when a wiper is used, thus more effectively removing foreign bodies.

The cleaning member 270 may mean, e.g., a wiper or brush. However, embodiments of the disclosure are not limited thereto.

Embodiments of the cleaning control device 200 are described below in detail according to the disclosure.

FIGS. 7A, 7B, 7C, and 7D are views illustrating an example of a cleaning control device as illustrated in FIG. 6, according to an embodiment of the disclosure.

Figure 7A:
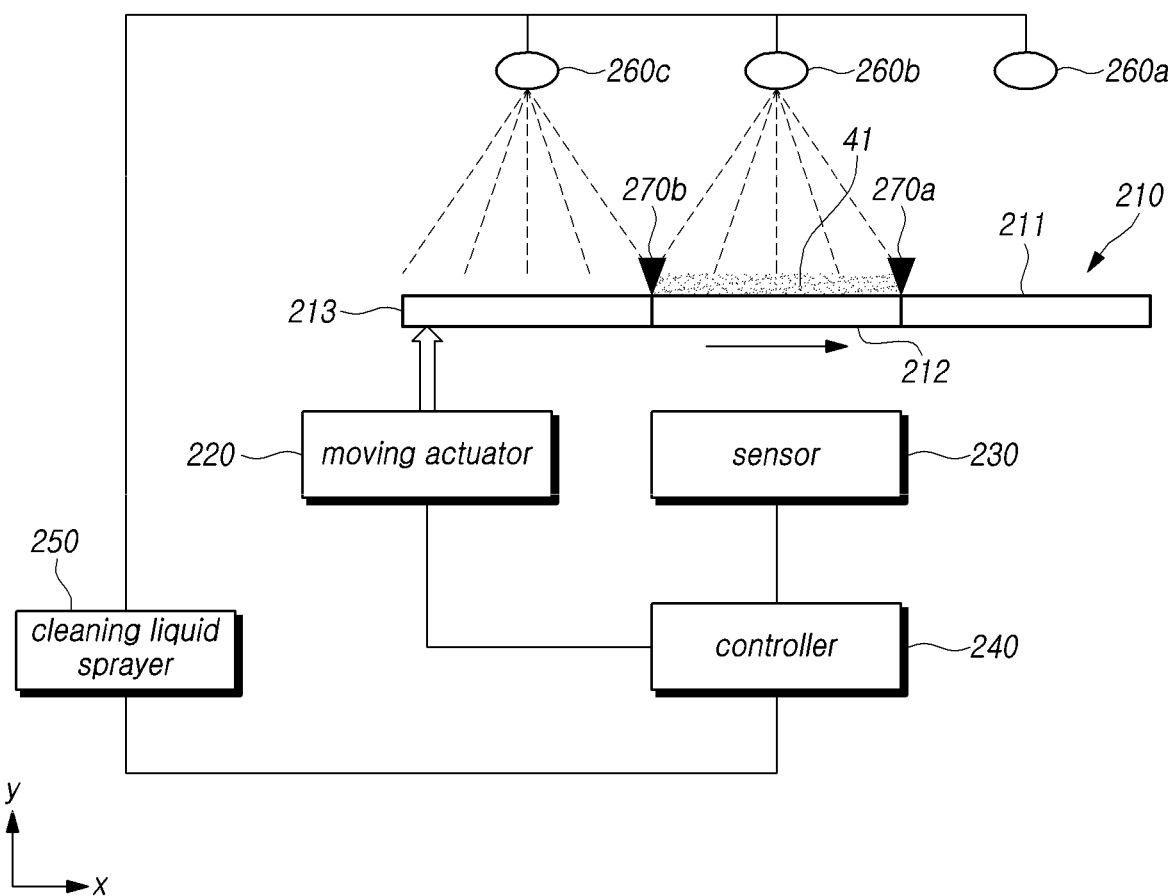

Referring to FIG. 7A, the sensor 230 may detect the object by transmitting/receiving a detection signal through the signal transmission region and, if a foreign body 41 is present in the signal transmission region, the sensor 230 may identify the foreign body 41 present in the signal transmission region.

For example, if the second region 212 of the shield 210 is disposed side-by-side with the sensor 230, the sensor 230 detects the object through the second region 212 which is the signal transmission region and, if the maximum value of the received detection signal is smaller than a reference threshold, the sensor 230 determines that the foreign body 41 is present in the second region 212 and outputs a contamination notification signal to the controller 240.

The controller 240 may generate a spraying control signal to spray the cleaning liquid through the nozzle corresponding to the signal transmission region and output the spraying control signal to the cleaning liquid sprayer 250.

For example, the controller 240 generates a spraying control signal to instruct to spray the cleaning liquid to the second region 212, which is the signal transmission region and outputs the spraying control signal to the cleaning liquid sprayer 250, and the cleaning liquid sprayer 250 sprays the cleaning liquid through the second nozzle 260b.

The controller 240 may generate and output a cleaning control signal to additionally spray the cleaning liquid to the signal non-transmission region before the shield 210 moves.

For example, the controller 240 generates a spraying control signal to spray the cleaning liquid to the third region 213, which is the signal non-transmission region before the shield 210 moves in the +x direction and outputs the spraying control signal to the cleaning liquid sprayer 250, and the cleaning liquid sprayer 250 sprays the cleaning liquid through the third nozzle 260c corresponding to the third region 213.

The controller 240 may generate a moving control signal to move the signal non-transmission region to the signal transmission region and output the moving control signal to the moving actuator 220.

For example, the controller 240 generates a moving control signal to instruct the shield 210 to move in the +x direction and outputs the moving control signal to the moving actuator 220.

Referring to FIG. 7B, the moving actuator 220 may receive the moving control signal and drive the shield 210 to move. For example, the moving actuator 220 drives the shield 210 to move in the +x direction.

In this case, since the cleaning member 270 is fixed to contact one surface of the shield 210, the foreign body 41 may be removed by a slide between the shield 210 and the cleaning member 270.

For example, the foreign body 41 present in the second region 212 may be removed by a slide between the second region 212 of the shield 210 and the first cleaning member 270a.

In a similar manner to what has been described above in connection with FIG. 4B, the controller 240 may adjust the spraying direction of the cleaning liquid sprayed to the signal transmission region (e.g., the second region 212) depending on the moving direction (e.g., the +x direction) of the shield.

As shown in FIG. 4C, the controller 240 may generate a moving control signal to move the signal non-transmission region to the signal transmission region and output the moving control signal to the moving actuator 220.

The controller 240 may generate a cleaning stop control signal to stop the spraying of the cleaning liquid and output the cleaning stop control signal to the cleaning liquid sprayer 250.

According to the foregoing description, the cleaning control device 200, according to an embodiment of the disclosure, may clean a replacement region of the shield 210, thereby preventing the sensor 230 from a detection error.

According to an embodiment of the disclosure, since the cleaning control device 200 includes the cleaning member 270, the cleaning control device 200 may remove the foreign body 41 present in the signal transmission region by moving back and forth the shield 210.

In other words, the controller 240 may generate a move-back-and-forth control signal to allow the shield to move back and forth with respect to the position of the signal transmission region and output the move-back-and-forth control signal to the moving actuator 220.

Figure 7D:
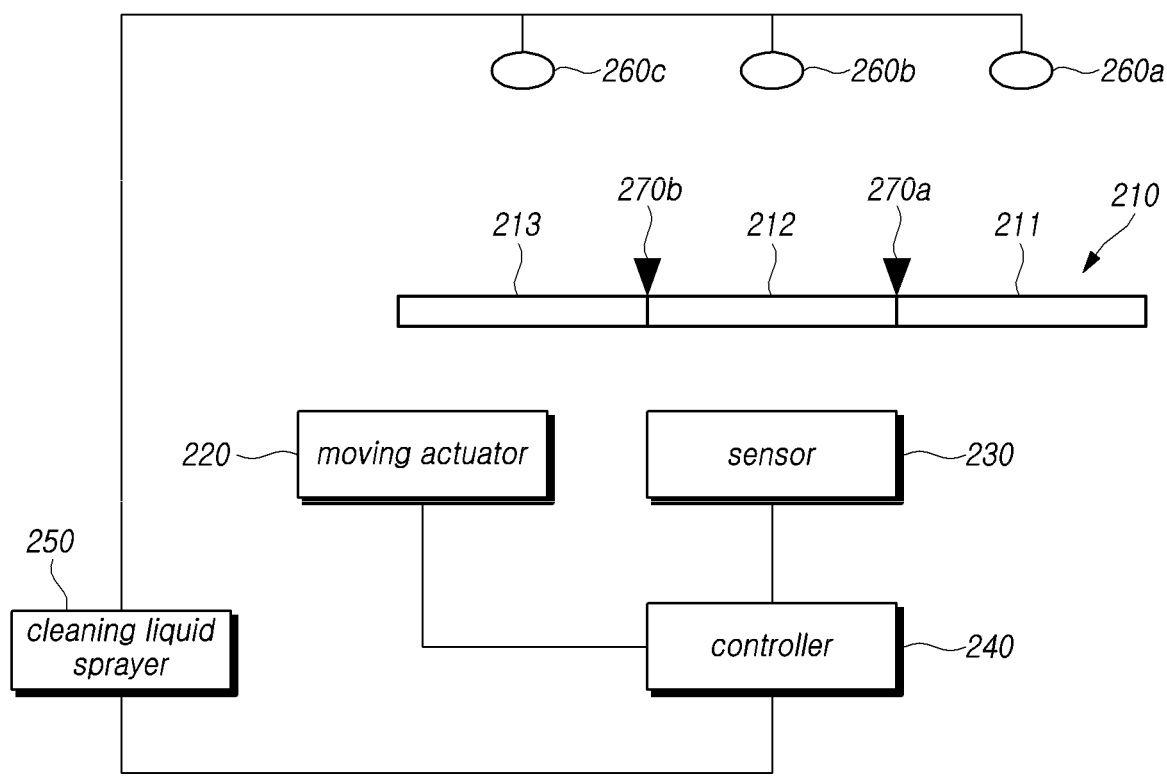

As an example, referring to FIGS. 7C and 7D, if the controller 240 generates a move-back-and-forth control signal and outputs the move-back-and-forth control signal to the moving actuator 220, the moving actuator 220 moves the shield 210 in the +x direction until the third region 213 is positioned side-by-side with the sensor 230 as shown in FIGS. 7A and 7B and then drives the shield 210 to move in the −x direction so that the second region 212 is positioned back side-by-side with the sensor 230.

According to the foregoing description, the cleaning control device 200, according to an embodiment of the disclosure, may remove the foreign body 41 by sliding back and forth the shield 210 even without switching into another region of the shield 210.

Figure 8A:
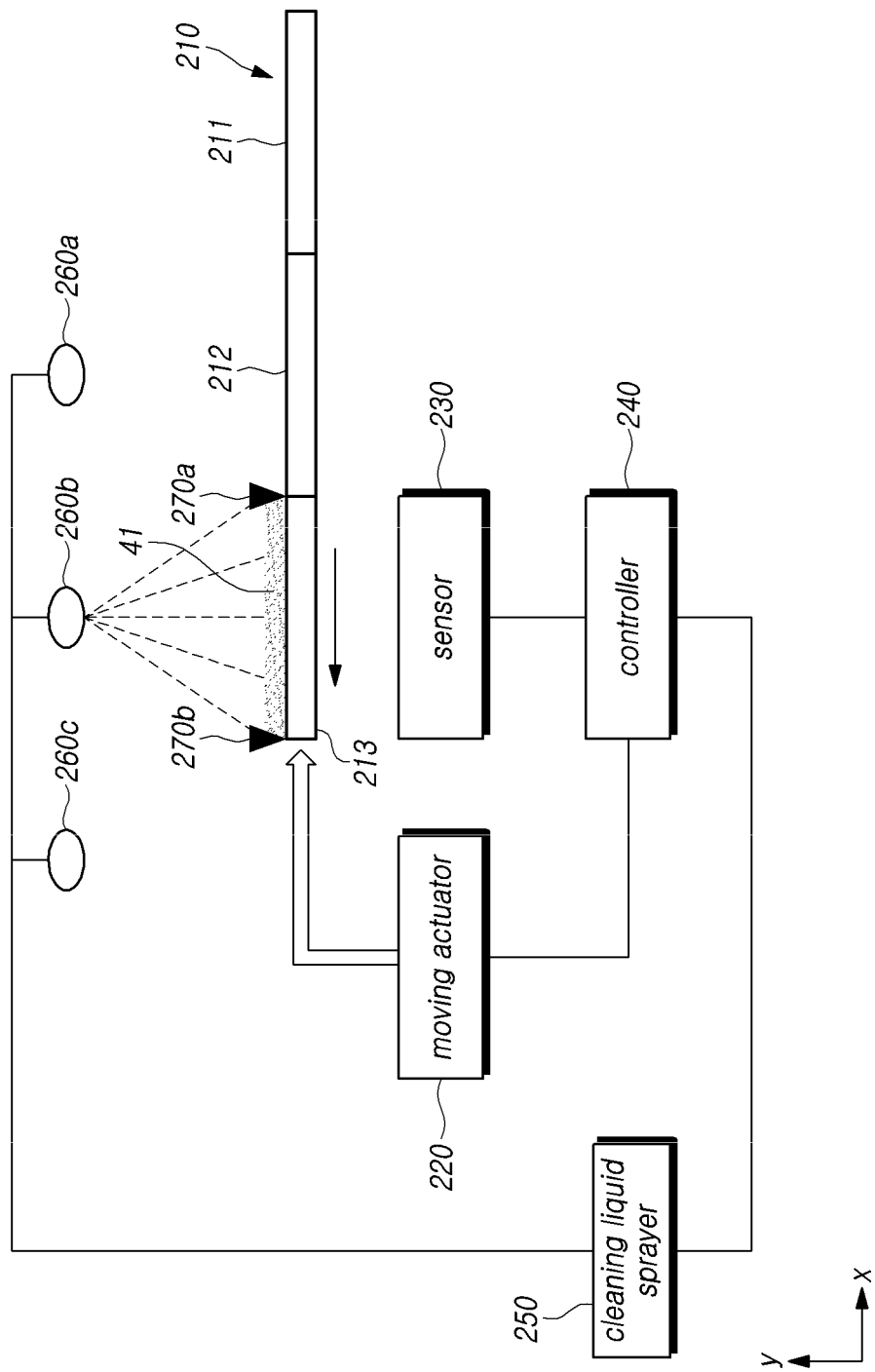
FIGS. 8A, 8B, and 8C are views illustrating an example of a cleaning control device as illustrated in FIG. 6, according to an embodiment of the disclosure.
Figure 8B:
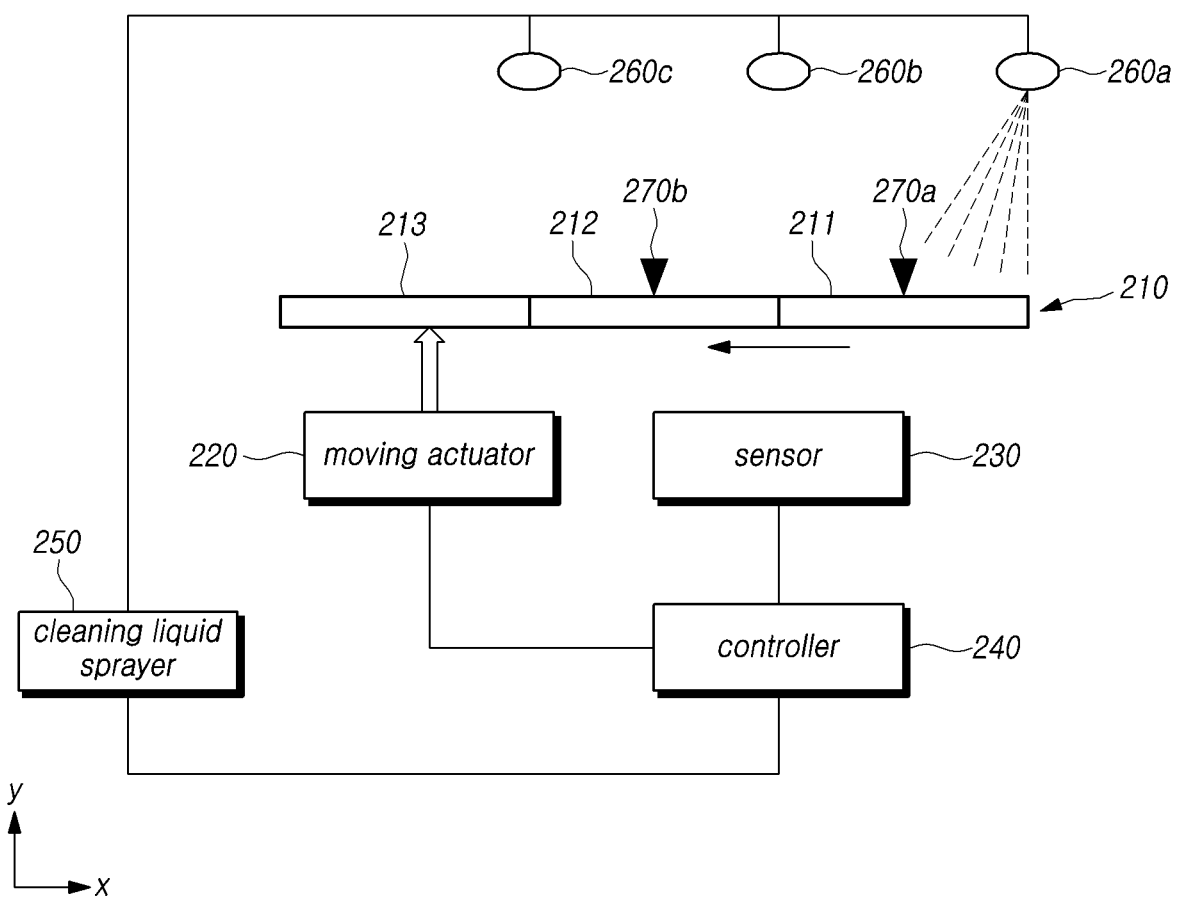
Figure 8C:
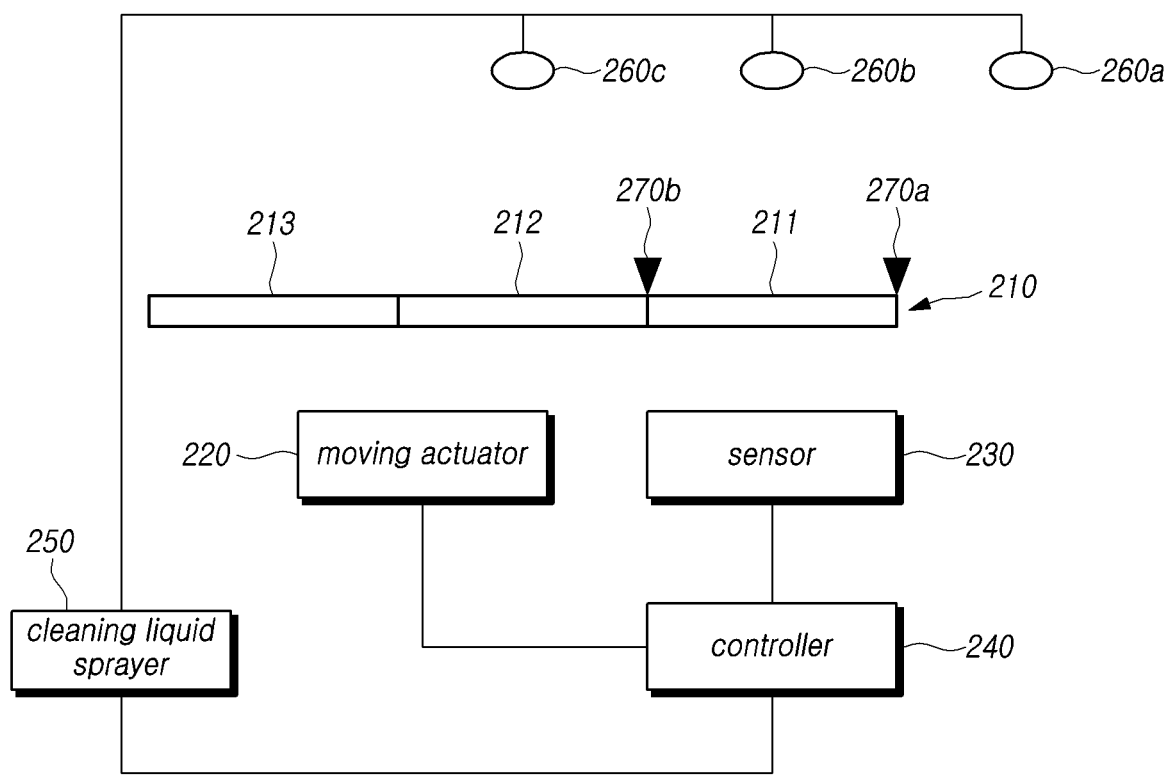

FIGS. 8A to 8C are views illustrating an example of a cleaning control device 200 as illustrated in FIG. 6, according to an embodiment of the disclosure.

Referring to FIG. 8A, a cleaning control device 200, according to an embodiment of the disclosure, may move any one of the signal non-transmission regions of the shield 210 to the signal transmission region, in a similar manner to that shown in FIG. 5.

As described above, if a foreign body 41 is present in the signal transmission region disposed side-by-side with the sensor 230, the controller 240 may generate a moving control signal and output the moving control signal to the moving actuator 220.

For example, if a foreign body 41 is present in the third region 213 disposed side-by-side with the sensor 230, the controller 240 generates a moving control signal to move the shield 210 to move in the −x direction and outputs the moving control signal to the moving actuator 220.

If the second region 212 of the shield 210 is unavailable as a signal transmission region due to, e.g., scratches or nicks, the controller 240 may control the movement of the shield 210 to allow the first region 211, instead of the second region 212, to be positioned side-by-side with the sensor 230.

For example, referring to FIG. 8B, the controller 240 continues to generate a moving control signal to allow the first region 211 to be positioned side-by-side with the sensor 230 and to become the signal transmission region and outputs the moving control signal to the moving actuator 220, and the moving actuator 220 drives the shield 210 to move in the −x direction.

In this case, the controller 240 may determine the spraying position of the cleaning liquid according to the moving direction of the shield 210 and generate and output a cleaning control signal to spray the cleaning liquid to the signal non-transmission region corresponding to the determined spraying position.

For example, if the shield 210 moves in the −x direction, the controller 240 may generate a cleaning control signal to spray the cleaning liquid through the first nozzle 260a and output the cleaning control signal to the cleaning liquid sprayer 250. However, without limitations thereto, the cleaning liquid may be sprayed through the second nozzle 260b.

Referring to FIG. 8C, if the signal non-transmission region moves to the signal transmission region and the movement of the shield 110 is done, the controller 240 may generate a cleaning stop control signal to stop the spraying of the cleaning liquid and output the cleaning stop control signal to the cleaning liquid sprayer 250.

The sensor 230 may detect the object by transmitting/receiving a detection signal through the signal transmission region (e.g., the first region 211) newly disposed side-by-side with the sensor 130.

According to the foregoing description, the cleaning control device 200, according to an embodiment of the disclosure, may prevent a malfunction in the sensor 230 by excluding some region of the shield 210 which may not be used as a signal transmission region.

A cleaning control method for performing all the embodiments of the disclosure is described below.

Figure 9:
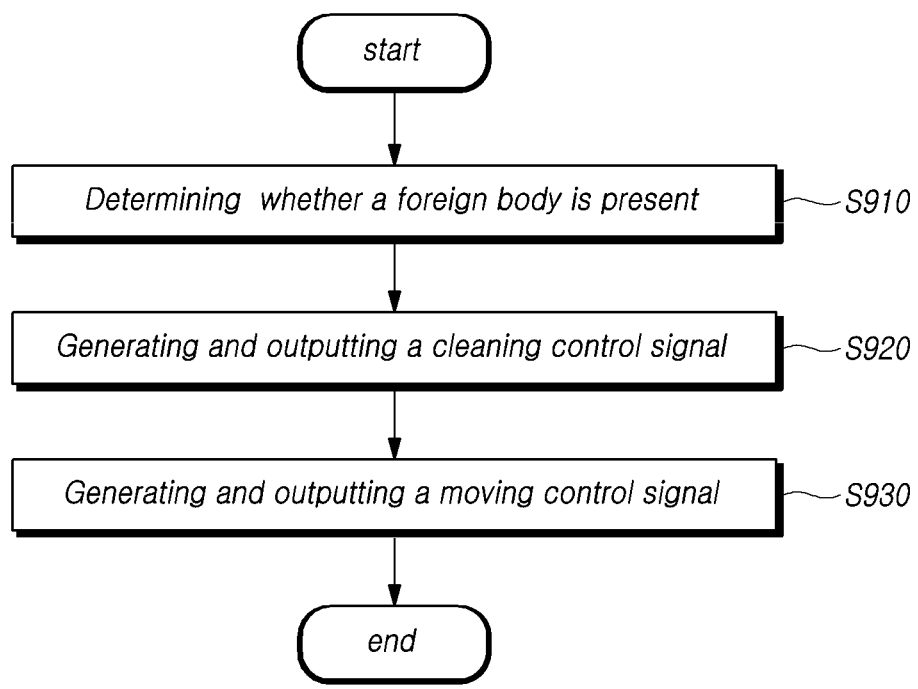
FIG. 9 is a flowchart illustrating a cleaning control method according to an embodiment of the disclosure.

FIG. 9 is a flowchart illustrating a cleaning control method according to an embodiment of the disclosure.

Referring to FIG. 9, a cleaning control method according to the disclosure may include a determining step S910, a cleaning control step S920, and a moving control step S930.

The determining step S910 determines whether a foreign body 40 or 41 is presented in the signal transmission region, through which a detection signal from the sensor 130 or 230 is transmitted, among the plurality of regions of the shield 110 or 210.

For example, the determining step S910 determines that the foreign body 40 or 41 is present in the signal transmission region if the maximum magnitude of the received detection signal is smaller than a preset reference threshold.

As another example, the determining step S910 determines that the foreign body 40 or 41 is present in the signal transmission region the received amount of the received detection signal is smaller than a preset reference received amount during a preset reception period.

As another example, if a reference distance which is measured all the time in a normal state is not measured or intermittently measured during a preset measurement period, the determining step S910 determines that the foreign body 40 or 41 is present in the signal transmission region.

The cleaning control step S920 may generate and output a cleaning control signal to spray the cleaning liquid to the signal transmission region if the foreign body 40 or 41 is present in the signal transmission region.

The cleaning control step S920 may generate and output a cleaning control signal to additionally spray the cleaning liquid to the signal non-transmission region before the shield 110 or 210 moves.

The moving control step S930 may generate and output a moving control signal to allow the signal non-transmission region, among the plurality of regions, to move to the signal transmission region if the foreign body 40 or 41 is present in the signal transmission region.

The moving control step S930 may generate and output a move-back-and-forth control signal to allow the shield 110 or 210 to move back and forth with respect from the position of the signal transmission region if there are a plurality of cleaning members 270 fixed and installed regardless of the movement of the shield 110 or 210 and contacting the boundary between the signal transmission region and the signal non-transmission region before the shield 110 or 210 moves.

The moving control step S930 may generate and output such a moving control signal that if the first signal non-transmission region moves to the signal transmission region and the movement of the shield 110 or 210 is complete, the first signal non-transmission region becomes a new signal transmission region (or the second signal transmission region) and, if the foreign body 40 or 41 is present in the first signal transmission region through which the detection signal is currently transmitted, the second signal non-transmission region of the plurality of regions moves to the new signal transmission region (or the second signal transmission region).

Although not shown, the cleaning control method, according to the disclosure, may further include a direction control step for generating and outputting a direction control signal to indicate the spraying direction to allow the spraying direction of the cleaning liquid sprayed to the signal transmission region to be varied depending on the moving direction of the shield 110 or 210 while the shield 110 or 210 moves.

As described above, according to the disclosure, there may be provided a cleaning control device and cleaning control method that may prevent foreign bodies from sticking to the sensor or prevent debris from hitting the sensor by placing a shield ahead of the sensor.

According to the disclosure, there may be provided a cleaning control device and cleaning control method that may prevent a malfunction in the sensor by cleaning foreign bodies off the shield.

According to the disclosure, there may be provided a cleaning control device and cleaning control method that may prevent a malfunction in the sensor and ensure driving safety by moving the shield to detect an object via a foreign body-free part of the shield.

According to the disclosure, there may be provided a cleaning control device and cleaning control method that may efficiently remove foreign bodies by adjusting the spraying direction of a cleaning liquid depending on the moving direction of the shield.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

| [Legend of reference numbers] | |
| --- | --- |
| 100, 200: cleaning control device | 110, 210: shield |
| 120, 220: moving actuator | 130, 230: sensor |
| 140, 240: controller | |
| 150, 250: cleaning liquid sprayer | |
| 160, 260: nozzle | 270: cleaning member |

What is claimed is:

1. A cleaning control device, comprising:
a shield divided into a plurality of regions;
a sensor configured to detect an object by transmitting and receiving a detection signal through one or more regions of the plurality of regions of the shield, wherein the shield is movable with respect to the sensor;
an actuator configured to move the shield with respect to the sensor; and
a controller configured to, if a foreign body is present in a signal transmission region of the shield placed side-by-side with the sensor among the plurality of regions of shield, output a cleaning control signal to spray a cleaning liquid to the signal transmission region of the shield placed side-by-side with the sensor among the plurality of regions of the shield output a moving control signal to move a signal non-transmission region of the shield placed non-side-by-side with the sensor among the plurality of regions of the shield to a position of the signal transmission region so that the signal non-transmission region of the shield placed non-side-by-side with the sensor is moved to be placed side-by-side with the sensor.

2. The cleaning control device of claim 1, wherein if a maximum magnitude of the received detection signal is smaller than a preset reference threshold, the sensor determines that the foreign body is present in the signal transmission region, generates a contamination notification signal, and outputs the contamination notification signal to the controller.

3. The cleaning control device of claim 1, wherein if a received amount of the detection signal is smaller than a preset reference received amount during a preset reception period, the sensor determines that the foreign body is present in the signal transmission region, generates a contamination notification signal, and outputs the contamination notification signal to the controller.

4. The cleaning control device of claim 1, wherein if a reference measurement always measured in a normal state is not measured or is intermittently measured during a preset measurement period, the sensor determines that the foreign body is present in the signal transmission region, generates a contamination notification signal, and outputs the contamination notification signal to the controller.

5. The cleaning control device of claim 1, further comprising a plurality of cleaning members fixed and installed regardless of the movement of the shield and contacting a boundary between the signal transmission region and the signal non-transmission region before the shield moves.

6. The cleaning control device of claim 1, wherein the controller outputs another cleaning control signal to additionally spray the cleaning liquid to the signal non-transmission region before the shield moves.

7. The cleaning control device of claim 6, wherein the controller generates and outputs a direction control signal to indicate a spraying direction of the cleaning liquid sprayed to the signal non-transmission region to allow the spraying direction to be varied depending on a moving direction of the shield while the shield moves.

8. The cleaning control device of claim 6, wherein the controller determines a spraying position of the cleaning liquid depending on a moving direction of the shield and generates and outputs the cleaning control signal to spray the cleaning liquid to the signal non-transmission region corresponding to the determined spraying position.

9. The cleaning control device of claim 5, wherein the controller generates and outputs a move-back-and-forth control signal to move back and forth the shield with respect to a position of the signal transmission region.

10. The cleaning control device of claim 1, wherein the controller generates and outputs a direction control signal to indicate a spraying direction of the cleaning liquid sprayed to the signal transmission region to allow the spraying direction to be varied depending on a moving direction of the shield while the shield moves.

11. The cleaning control device of claim 1, wherein the signal non-transmission region includes a first signal non-transmission region and a second signal non-transmission region, wherein
if the first signal non-transmission region moves to the signal transmission region and the movement of the shield is complete, the first signal non-transmission region becomes a second signal transmission region, and wherein
the controller generates and outputs a moving control signal to move the second signal non-transmission region among the plurality of regions to move to a position of the second signal transmission region if the foreign body is present in the second signal transmission region.

12. The cleaning control device of claim 1, wherein the shield is disposed at an acute or obtuse angle from a ground.

13. The cleaning control device of claim 1, wherein the shield further includes a heating member disposed on a surface of the shield, which faces an output part of the sensor and electrically connected with the controller, and wherein
the controller generates a heating control signal to generate heat from the heating member and applies the heating control signal to the heating member.

14. The cleaning control device of claim 1, wherein the sensor is an optical sensor detecting the object by transmitting and receiving an optical signal.

15. The cleaning control device of claim 1, further comprising a cleaning liquid sprayer spraying the cleaning liquid to the shield through a nozzle.

16. A cleaning control method, comprising:
determining whether a foreign body is present in a signal transmission region of a shield through which a detection signal from a sensor is transmitted among a plurality of regions of the shield, wherein the shield is movable with respect to the sensor by an actuator;
if the foreign body is present in the signal transmission region of the shield, through which the detection signal from the sensor is transmitted among the plurality of regions of the shield, outputting a cleaning control signal to spray a cleaning liquid to the signal transmission region of the shield and outputting a moving control signal to move a signal non-transmission region of the shield, through which the detection signal from the sensor is not transmitted among the plurality of regions of the shield, to a position of the signal transmission region by moving the shield so that the signal non-transmission region of the shield placed non-side-by-side with the sensor is moved to be placed side-by-side with the sensor.

17. The cleaning control method of claim 16, wherein the outputting of the cleaning control signal includes outputting another cleaning control signal to additionally spray the cleaning liquid to the signal non-transmission region before the shield moves.

18. The cleaning control method of claim 16, wherein the outputting of the moving control signal includes outputting a move-back-and-forth control signal to move back and forth the shield with respect to the position of the signal transmission region if there are a plurality of cleaning members fixed and installed regardless of the movement of the shield and contacting a boundary between the signal transmission region and the signal non-transmission region before the shield moves.

19. The cleaning control method of claim 16, wherein the signal non-transmission region includes a first signal non-transmission region and a second signal non-transmission region, wherein
if the first signal non-transmission region moves to the signal transmission region and the movement of the shield is complete, the first signal non-transmission region becomes a second signal transmission region, and wherein
the outputting of the moving control signal includes outputting a moving control signal to move the second signal non-transmission region among the plurality of regions to move to a position of the second signal transmission region if the foreign body is present in the second signal transmission region.

20. The cleaning control method of claim 16, further comprising outputting a direction control signal to indicate a spraying direction of the cleaning liquid sprayed to the signal transmission region to allow the spraying direction to be varied depending on a moving direction of the shield while the shield moves.

* * * * *